United States Patent
Georgieva et al.

(10) Patent No.: US 8,510,717 B2
(45) Date of Patent: Aug. 13, 2013

(54) METHOD AND SYSTEM FOR TESTING APPLICATION MODULES USING STATIC TESTS FROM A TEST SUITE

(75) Inventors: Violeta Georgieva, Sofia (BG); Nikolai Dokovski, Sofia (BG)

(73) Assignee: SAP AG, Walldorf (DE)

( * ) Notice: Subject to any disclaimer, the term of this patent is extended or adjusted under 35 U.S.C. 154(b) by 1130 days.

(21) Appl. No.: 12/112,888

(22) Filed: Apr. 30, 2008

(65) Prior Publication Data

US 2008/0270992 A1    Oct. 30, 2008

Related U.S. Application Data

(60) Provisional application No. 60/926,989, filed on Apr. 30, 2007.

(51) Int. Cl.
*G06F 9/44* (2006.01)
(52) U.S. Cl.
USPC .......................................... 717/126; 717/124
(58) Field of Classification Search
USPC ....................................................... 717/124
See application file for complete search history.

(56) References Cited

U.S. PATENT DOCUMENTS

| | | | |
|---|---|---|---|
| 6,684,387 B1 * | 1/2004 | Acker et al. ................... | 717/126 |
| 7,627,671 B1 * | 12/2009 | Palma et al. ................... | 709/224 |
| 7,711,551 B2 * | 5/2010 | Lopez-Barquilla et al. ...... | 704/9 |
| 2002/0133806 A1 * | 9/2002 | Flanagan et al. ............... | 717/123 |
| 2006/0123332 A1 * | 6/2006 | Berg et al. ...................... | 715/512 |
| 2007/0006041 A1 * | 1/2007 | Brunswig et al. ............... | 714/38 |
| 2007/0089092 A1 * | 4/2007 | Schmidt et al. ................. | 717/126 |
| 2008/0127070 A1 * | 5/2008 | Barcia et al. ................... | 717/116 |

OTHER PUBLICATIONS

U.S. Appl. No. 10/637,453, filed Aug. 2003, Chelf et al.*
Jan Newmarch, Foundations of Jini 2 Programming, Apress 2006, p. 434.*
Using Annotations to Check Structural Properties of Classes by Michael Eichberg, Thorten Schafer, and Mira Mezini (hereafter Eichberg), M. Cerioli (Ed.): FASE 2005, LNCS 3442, pp. 237-252, 2005, Springer-Verlag Berlin Heidelberg 2005.*

* cited by examiner

*Primary Examiner* — Lewis A Bullock, Jr.
*Assistant Examiner* — Hau H Hoang

(57) ABSTRACT

A method and a system for validating a plurality of files via static tests from a test suite are described. The method includes selecting a plurality of static tests from a test suite, executing the plurality of static tests on a plurality of files to validate the plurality of files, and storing records after executing the plurality of static tests to record the validation of the plurality of files. The system includes an application, a plurality of files inside the application, the plurality of files to describe and configure the application, a plurality of static tests to validate the plurality of files, and a framework to apply the plurality of static tests to the plurality of files.

29 Claims, 3 Drawing Sheets

METHOD AND SYSTEM FOR TESTING APPLICATION MODULES USING STATIC TESTS FROM A TEST SUITE

CROSS REFERENCE TO RELATED APPLICATION

This application claims priority from Provisional Application No. 60/926,989 entitled "Web Container et al." and filed on Apr. 30, 2007.

BACKGROUND

1. Field of Invention

Embodiments of the invention relate generally to the software arts, and, more specifically, to a method and a system to test and verify application modules using static tests from a test suite.

2. Background

A programmer can make an error (mistake), which produces a defect (fault, bug) in the code, in software or a system, or in a document. If a defect in code is executed, the system will fail to do what it should do (or do something it is not supposed to), causing a failure. Defects in software, systems or documents may result in failures. A fault can also turn into a failure when the environment is changed. Examples of these changes in environment include the software being run on a new hardware platform, alterations in source data or interacting with different software.

Software testing is the process used to assess the quality of computer software. Software testing is an empirical technical investigation conducted to provide stakeholders with information about the quality of the product or service under test, with respect to the context in which it is intended to operate. This includes, but is not limited to, the process of executing a program or application with the intent of finding software bugs. Software testing may be viewed as an important part of the software quality assurance (SQA) process. In SQA, software process specialists and auditors take a broader view on software and its development. They examine and change the software engineering process itself to reduce the amount of faults that may increase the defect rate.

There are many approaches to software testing. Reviews, walkthroughs or inspections are considered static testing, whereas actually running the program with a given set of test cases at a given development stage is referred to as dynamic testing. Software testing is used in association with verification and validation. In general, validation is the process of checking if something satisfies a certain criterion. In a quality management system, validation usually relates to confirmation that the needs of an external customer or user of a product, service, or system are met. Verification is usually an internal quality process of determining compliance with a regulation, standard, or specification.

A common practice of software testing is performed by an independent group of testers after the functionality is developed before it is shipped to the customer. This practice often results in the testing phase being used as buffer to compensate for project delays, thereby compromising the time devoted to testing. Another practice is to start software testing at the same moment the project starts and continue the process until the project finishes.

SUMMARY OF THE INVENTION

A method and a system for validating a plurality of files via static tests from a test suite is described. The method includes selecting a plurality of static tests from a test suite, executing the plurality of static tests on a plurality of files to validate the plurality of files, and storing records after executing the plurality of static tests to record the validation of the plurality of files.

The system includes an application, a plurality of files inside the application, the plurality of files to describe and configure the application, a plurality of static tests to validate the plurality of files, and a framework to apply the plurality of static tests to the plurality of files.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
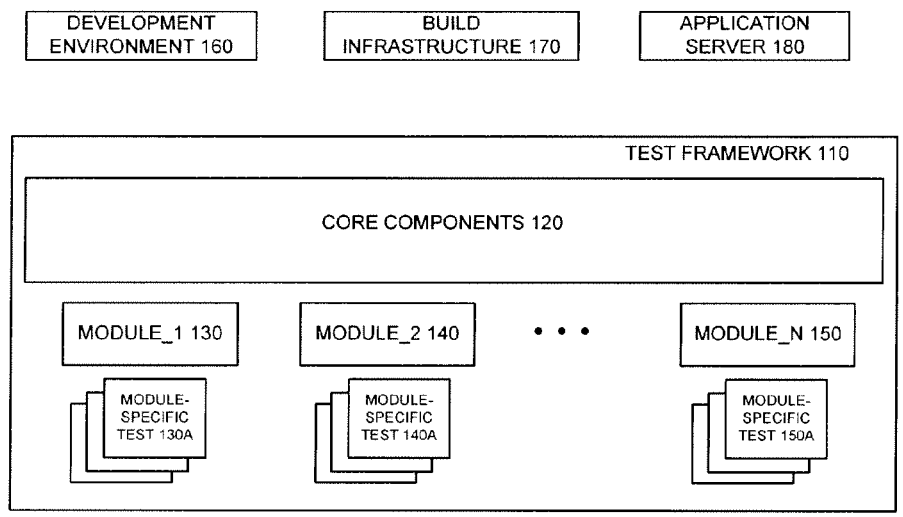
FIG. 1 is a block diagram of an embodiment of a test framework that includes a plurality of static tests.

Embodiments of the invention relate to a method and a system for validating a plurality of files via static tests from a test suite. The static tests help developers of different applications to verify and validate whether their applications are buildable, deployable, and fulfill given specifications, such as the Sun's Java Enterprise Edition (EE) specifications and standards. Development groups use these tests to be sure that every application will be verified during development or deployment time not only for structural correctness but semantic correctness as well. Therefore, the test suite needs to assure correctness of a plurality of files against Sun's Java EE specifications and against proprietary standards such as SAP NetWeaver's specifications.

In one embodiment, the test suite with the static tests can be integrated into a development environment or build infrastructure and thus to provide correct and verified applications to any application server. In other embodiments, the test suite can be integrated into both, the application server and the development environment or only into the application server. Having the test suite integrated into an application server, enables static checks to be performed for particular standards compliance on the application server itself. These checks are executed just before deployment of the applications.

The static tests are written once and can be executed in all environments: development environment, build infrastructure, application server, etc. The application developer receives exactly the same result from each environment if the tests are the same. The static tests are grouped in a test suite. New static tests can be easily included by adding them to the existing test suite. New custom static tests can be created for different modules of an application server and added to the test suite. The test suite is then archived and integrated in the application server or the development environment. The output of the static tests can be persisted and used later if needed.

In one embodiment, the static tests can be integrated and executed via a test framework. Such framework is the JLin tool developed by SAP and integrated in SAP NetWeaver.

JLin is a tool for static analysis of Java design-time artifacts. Using a plurality of tests (or checks), it identifies and signals potential error sources, checks internal consistency, enforces coding conventions, evaluates statistics and metrics, enforces architectural patterns.

The JLin tool enables application developers to investigate the properties of Java source files and check the syntax of their semantics. Checks or tests for metrics, conventions, compatibilities, authorizations, and language restrictions, for example, are delivered as standard. In addition, separate custom checks can be created and performed by specifying a set of check parameters. Thus, a check run can include several single checks, which can be performed on one or more source code files. After the check run is completed, the system displays a list containing the test results as information, warnings, or errors, along with location of the problem in the source code. Thus JLin is a suitable development tool that can be called either in a Java program or as a separate plug-in. Static tests part of a test suite can be invoked and executed via the JLin tool.

It should be noted that the test suite with a plurality of static tests may be packed in an archive file and therefore, can be invoked and executed by any test framework; the JLin tool is only an example of such framework.

FIG. 1 is a block diagram of an embodiment of a test framework that includes a plurality of static tests. Test framework 110 executes tests on a plurality of files. Test framework 110 includes core components 120 that provide the functionality of the framework. Test framework 110 also includes a set of modules such as module_1 130, module_2 140, and module_n 150. For each module, there are standard module-specific tests. For module_1 130, these are module-specific tests 130A; for module_2 140, these are module-specific tests 140A; and for module_n 150, these are module-specific tests 150A. The modules with the corresponding tests check particular files, for example module_1 130 may check Java documentation files, module_2 140 may check Java EE deployment descriptor files, and module_3 150 may execute performance checks when accessing a SQLJ database. Test framework 110 can be integrated as plug-in in development environment 160. Thus, any plurality of source files developed in development environment 160 can be tested via the module-specific tests. Test framework 110 can also be integrated in build infrastructure 170 and application server 180. This provides validation and verification of the plurality of source files when building applications and before deploying the applications on the application server 180.

Figure 2:
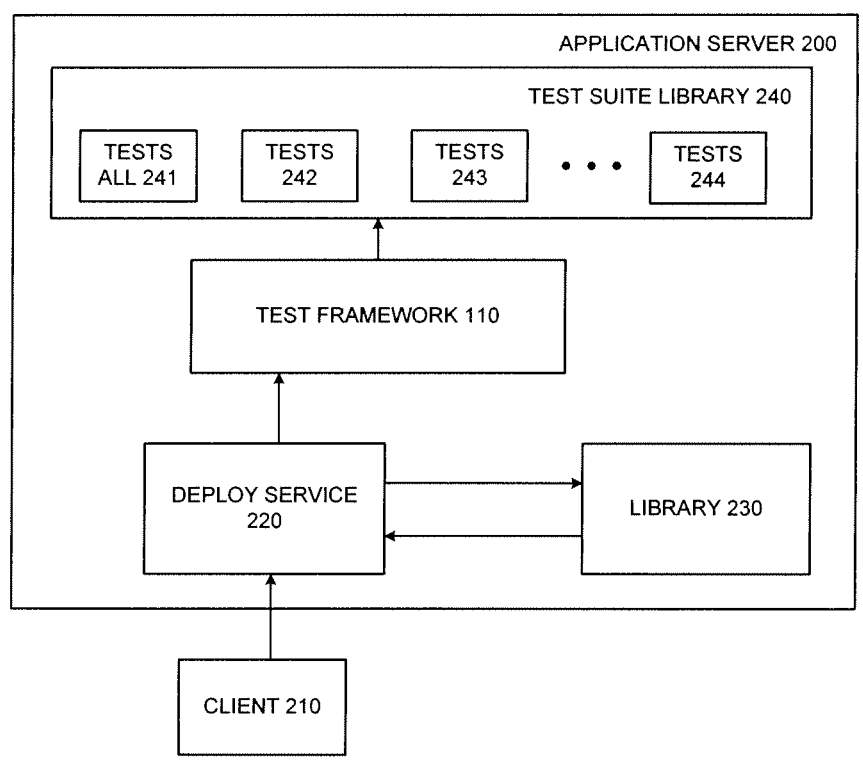
FIG. 2 is a block diagram of an embodiment for executing a plurality of static tests from a test suite via a test framework in an application server.

FIG. 2 is a block diagram of an embodiment for executing a plurality of static tests from a test suite via a test framework in an application server. Application server 200 is a standard application server that supports a number of specifications and standards including but not limited to Sun's Java EE specification. Application server 200 is used for deployment and execution of different applications. In one embodiment, this application may be an enterprise application. An enterprise application is an application that conforms to the Sun's Java 2 Platform, Enterprise Edition, specification and also to the Java EE 5 specification. The enterprise application (or just application) can consist of the following: zero or more EJB modules, zero or more Web modules, zero or more application client modules, and any combination of the above, as long as it contains at least one module. The application is represented by, and packaged in, an enterprise archive (EAR) file. This EAR file is passed, when a user wants to deploy the application on an application server, such as application server 200.

A Web module represents a Web application. It is used to assemble servlets and JavaServer Pages (JSP) files, as well as static content such as Hyper Text Markup Language (HTML) pages, into a single deployable unit. Web modules are stored in Web archive (WAR) files, which are standard Java archive files. A Web module contains the following: one or more servlets, JSP files, and other files, and a deployment descriptor, stored in an eXtensible Markup Language (XML) file. This file, named web.xml, declares the contents of the module. It contains information about the structure and external dependencies of Web components in the module and describes how the components are to be used at run-time.

Referring back to FIG. 2, to deploy an application, user sends a deploy request for a particular application via a client device 210. Client device 210 may be an administrator tool with Graphical User Interface (GUI) part. The deploy request is forwarded to deploy service 220. Deploy service 220 manages the deployment of applications and the distribution of their modules (Web modules, EJB modules, or application client modules) to the corresponding application server components. Deploy service 220 checks if the application is written in compliance with the Java EE 5 specifications by checking its version. If the version of the application is Java EE 5, then deploy service 220 invokes library 230. Library 230 returns a tree structure containing all annotations for this application according to the Java EE 5 standard. An "annotation", in the Java computer programming language, is a special form of syntactic metadata that can be added to Java source code. Classes, methods, variables, parameters and packages may be annotated. Unlike JavaDoc tags, Java annotations are embedded in class files generated by a compiler and may be retained by the Java Virtual Machine to be made retrievable at run-time.

Deploy service 220 passes to test framework 110 the received annotations, the modules of the application, and global information for the application. Test framework 110 invokes test suite library 240. Test suite library 240 contains a plurality of static tests separated in groups such as tests-all 241, tests 242, tests 243, and tests 244. Tests-all 241 contains tests that are valid for and executed on all available modules of an application. Tests 242, tests 243, and tests 244 contain tests that are valid for and executed on a specific application module. For example, if the application to be deployed is a Web application, it will contain a Web module. Therefore, deploy service 220 will send the test framework 110, annotations for this application, the Web module, and global information for the enterprise archive file (EAR) of the application. Then, test framework 110 will invoke test-all 241 tests and afterwards the specific tests applicable for Web modules, for example tests 242.

Test framework 110 first invokes static tests-all 241 from test suite library 240. First test of tests-all 241 checks if the deployment descriptor file (for example, web.xml) of the application is Java EE 5 version. If the deployment descriptor file is not, then the test converts the XML file into Java EE 5 XML file. The second test of the test-all 241 group parses the deployment descriptor to validate the XML file against schema and check the syntax of the file. Then, next test checks if the application module (e.g., Web module) contains annotations and verifies the syntax of the annotations. If these tests are successful, test framework 110 builds a model that describes the deployment descriptor and annotation information of the corresponding module of the application in Java source code instead of XML structure. After the model is successfully built, test framework 110 sends the model to the corresponding applicable group of tests for executing module-specific tests. For example, if a Web model is built from Web modules descriptor XML files and annotations for this Web module, this Web model is sent to the group of tests that are specific and applicable for Web modules.

The module-specific tests, such as tests 242, 243, and 244, check for file existence, specific properties of a resource, if the resource implements a specific interface, if the resource extends a specific class, if the resource is in the application class path, and so on. Some of the tests can be mandatory; others can be omitted for performance reasons. A new static test can be created if a desired test is not present in the plurality of tests and added to the test suite. Records are stored in the form of log files after executing the plurality of static tests to record the validation of the plurality of files of the application. This verification and validation of an application, ensures that the application is correctly built, all elements are present, and all descriptor files are semantically and structurally correct. If all tests are passed successfully, then deploy service 220 deploys the particular application on application server 200.

Figure 3:
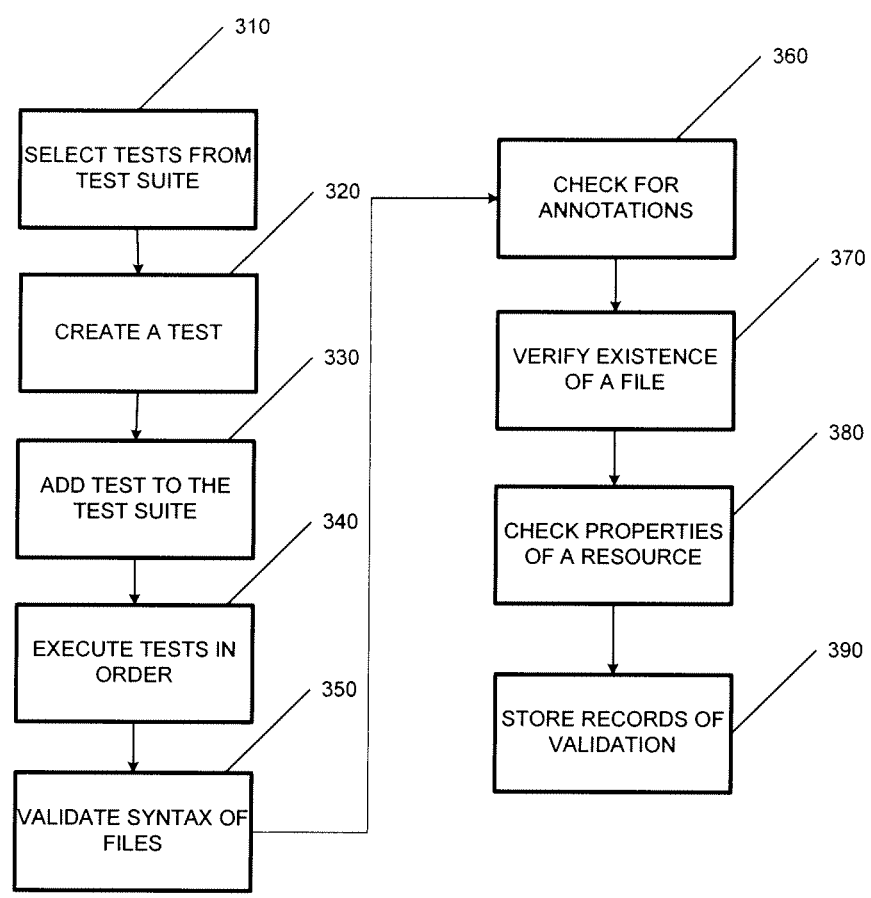
FIG. 3 is a flow diagram of an embodiment of the invention for executing a plurality of static tests from a test suite to validate a plurality of files.

FIG. 3 is a flow diagram of an embodiment of the invention for executing a plurality of static tests from a test suite to validate a plurality of files. The test suite with the static tests is packed in a library or an archive file and can be imported in an application server, development environment, or build infrastructure. Thus, all static tests become available for use. At block 310 a plurality of static tests are selected from a test suite. At block 320, a new static test is created if a desired test is not present in the plurality of tests. The created static test is added to the test suite at block 330. At block 340 all tests are executed in specific order. First, at block 350, a validation test is executed for each of the plurality of files to validate syntax against a particular specification. In one embodiment, this test provides XML validation of all XML files against schema specification and standard.

At block 360 a test is executed to check if the plurality of files contains annotations and verifying the syntax of the annotations. Referring to FIG. 2, this corresponds to invocation of tests-all 241. After these two tests are executed, then the rest of the static tests applicable for this application from the test suite are executed without the need of a specific order. At block 370, a test is run that verifies that a file specified in another file in the plurality of files exists inside an application. At block 380, a set of static tests are executed to check specific properties of a resource stored inside an application and defined in a particular file of the plurality of files. These tests check if the resource implements a specific interface, if the resource extends a specific class, and if the resource is in the application's class path.

At block 390, records are stored after executing the plurality of static tests to record the validation of the plurality of files. These records may be stored in the form of log files. The test suite with the plurality of static tests can be executed during each of a development phase, a deployment phase, and a test phase of an application. One test in the suite may depend from another test, that is a first test my require execution of a second test prior to the first test's execution.

Some applications, for example JavaServer Faces (JSF) applications, depend on correctly initialized environment to run properly. The environment of these applications can be configured using XML configuration files bundled with the applications. The configuration files have XML syntax that should be valid according an XML schema defined in a specification. Although XML validation is a form of check it cannot guarantee the proper configuration of these applications. A test suite with a plurality of static tests is a resource efficient and extendable option that guarantees correct JSF application configuration.

JSF applications can be extended with user interface (UI) components. Those components should be described in the application's XML configuration file by adding a specific tag in the XML configuration file. The XML may be valid but if the component described does not extend "UIComponent" interface defined in the corresponding JSF specification, the JSF runtime environment of the application server will not be able to use it. That form of validation cannot be handled by XML validation tools. In most cases, if such checks are skipped this could lead to non-configured JSF runtime environment in the application server. Those additional checks guarantee that the application developer will be notified during deployment time that the application may not work as expected.

A test environment, such as the JLin tool, inspects the JSF application configuration and builds a verification manager that holds a group of tests (verifiers) that should be executed for that application. Once constructed, the verifiers are executed sequentially. The exact set of verifiers is determined during JSF application validation process and it is a resource efficient process, since it depends on the content of the JSF application configuration. For example, if a JSF application does not add UI components, the corresponding verifier is not part of the validation process.

In some embodiments, there are three types of verifiers ComponentVerifier, ComponentClassVerifier and MBeanVerifier. The ComponentInterfaceVerifier checks whether the tested resource implements a specific interface. For instance, any custom PhaseListeners should implement javax.faces.event.PhaseListener interface. The ComponentClassVerfier checks whether the tested resource extends a specific class. For instance, any custom UI component should extend javax.faces.component.UIComponent abstract class. The MBeanVerifier checks whether the tested resource can be found in the application class path. Verifiers use predefined set of checks to implement their test logic. The checks provided include: interface existence check, correct class path check, and class existence check. If additional test logic is needed, it can easily be supplied by adding additional checks. These checks are static tests that can be part of a test suite.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. The invention may be downloaded as a computer program, which may be transferred from a remote computer (e.g., a server) to a requesting computer (e.g., a client) by way of a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A computer-implemented method comprising:
   selecting, by a processor of the computer, a plurality of static tests from a test suite;
   based on the selected plurality of static tests, determining, by the processor of the computer, validity of a plurality of files inside an application, wherein determining validity of the plurality of files includes:
      executing, by the processor of the computer, a first subset of the plurality of static tests on the plurality of files for checking the plurality of files inside the application;
      based on a result of execution of the first subset of the plurality of static tests, building, by the processor of the computer, a model including annotation information and deployment descriptor of the application;
      forwarding the built model to a second subset of the plurality of static tests, from a plurality of file type specific tests, corresponding to a file type of the plurality of files; and
      executing, by the processor of the computer, the second subset of the plurality of static tests on the built model; and
   storing, in a memory of the computer, records including the validity of the plurality of files determined based on a result of execution of the first and the second subset of the plurality of static tests.

2. The computer-implemented method of claim 1 further comprising:
   creating, by the processor of the computer, a static test when a desired test is not present in the plurality of tests; and
   adding, by the processor of the computer, the desired test to the test suite.

3. The computer-implemented method of claim 1, wherein executing the first subset of the plurality of static tests comprises:
   verifying, by the processor of the computer, the syntax of the plurality of files against a specification; and
   checking, by the processor of the computer, whether the plurality of files contain annotations and verifying the syntax of the annotations.

4. The computer-implemented method of claim 1, further comprising:
   storing, in the memory of the computer, the plurality of tests in a library on an application server.

5. The computer-implemented method of claim 1, further comprising:
   applying, by the processor of the computer, the plurality of tests during at least one of a development phase, a deployment phase, and a test phase of the application.

6. The computer-implemented method of claim 1, further comprising:
   defining, by the processor of the computer, a dependence from a first test of the plurality of static tests to a second test of the plurality of static tests.

7. The computer implemented method according to claim 1, wherein determining validity of the plurality of files comprises:
   verifying, by the processor of the computer, that another of the plurality of files specified in one of the plurality of files exists inside the application.

8. The computer implemented method according to claim 7, wherein executing the second subset of the plurality of static tests comprises:
   checking, by the processor of the computer, properties of a resource stored inside the application and defined in the one of the plurality of files.

9. The computer-implemented method of claim 8, wherein the checking properties of the resource comprises:
   checking, by the processor of the computer, whether the resource implements a specific interface;
   checking, by the processor of the computer, whether the resource extends a specific class; and
   checking, by the processor of the computer, whether the resource is in an application class path.

10. The computer implemented method of claim 1, further comprising:
    analyzing, by the processor of the computer, an application configuration of the application;
    based on the analysis, determining, by the processor of the computer, the plurality of static tests to be executed for checking the plurality of files; and
    building, by the processor of the computer, a verification manager including the determined plurality of static tests.

11. The computer implemented method of claim 1, wherein executing the first subset of the plurality of static tests comprises:
    in a pre-specified order, executing, by the processor of the computer, the first subset of the plurality of static tests.

12. The computer implemented method of claim 1, wherein executing the second subset of the plurality of static tests comprises:
    in a non-specified order, executing, by the processor of the computer, the second subset of the plurality of static tests.

13. A computing system comprising:
    a processor; and
    a memory coupled to the processor storing program code, the program code comprising:
       an application;
       a plurality of files inside the application, the plurality of files to describe and configure the application;
       a first subset of a plurality of static tests to execute the plurality of files for checking the plurality of files inside the application;
       a model including annotation information and deployment descriptor of the application, wherein the model is built based on result of execution of the first subset of the plurality of tests;
       a second subset of the plurality of static tests configured to execute the built model, wherein the built model is forwarded to the second subset of the plurality of static tests, from a plurality of file type specific tests, corresponding to a file type of the plurality of files; and
       a framework to apply the plurality of static tests to the plurality of files.

14. The computing system of claim 13, further comprising:
    an application server having a library storing the plurality of static tests.

15. The computing system of claim 13, wherein the first subset of the plurality of static tests comprises:
    at least a test to verify syntax of the plurality of files against a specification, and a test to check whether the plurality of files contain annotations and to verify the syntax of the annotations.

16. The computing system of claim 13, wherein a first test of the plurality of static tests can be dependent on a second test of the plurality of static tests.

17. The computing system of claim 13, wherein the second subset of the plurality of static tests comprises:
a test to check properties of a resource stored inside the application, the resource defined in the first file.

18. The computing system of claim 17, wherein the test to check properties comprises:
at least a test to check whether the resource implements a specific interface, a test to check whether the resource extends a specific class, and a test to check whether the resource is in the application class path.

19. The computing system of claim 13, further comprising:
a verification manager including the plurality of tests to be executed for checking the plurality of files, the plurality of files being determined based on analysis of an application configuration of the application.

20. A non-transitory machine-readable medium having instructions therein that when executed by the machine, cause the machine to:
select a plurality of static tests from a test suite;
based on the selected plurality of static tests, determine validity of a plurality of files inside an application, wherein steps to determine validity of the plurality of files includes:
execute a first subset of the plurality of static tests on the plurality of files for checking the plurality of files inside the application;
based on a result of execution of the first subset of the plurality of static tests, build a model including annotation information and deployment descriptor of the application;
forward the built model to a second subset of the plurality of static tests, from a plurality of file type specific tests, corresponding to a file type of the plurality of files; and
execute the second subset of the plurality of tests on the built model; and
store records including the validity of the plurality of files determined based on a result of execution of the first and the second subset of the plurality of static tests.

21. The non-transitory machine-readable medium of claim 20 having instructions that when executed further cause the machine to:
create a static test when a desired test is not present in the plurality of tests; and
add the desired test to the test suite.

22. The non-transitory machine-readable medium of claim 20, wherein instructions causing the machine to execute the first subset of the plurality of static tests comprise instructions causing the machine to:
verify the syntax of the plurality of files against a specification; and
check whether the plurality of files contain annotations and verifying the syntax of the annotations.

23. The non-transitory machine-readable medium of claim 20 having instructions that when executed further cause the machine to:
store the plurality of tests in a library on an application server.

24. The non-transitory machine-readable medium of claim 20 having instructions that when executed further cause the machine to:
apply the plurality of tests during at least one of a development phase, a deployment phase, and a test phase of the application.

25. The non-transitory machine-readable medium of claim 20 having instructions that when executed further cause the machine to:
define a dependence from a first test of the plurality of static tests to a second test of the plurality of static tests.

26. The non-transitory machine-readable medium of claim 20, wherein instructions causing the machine to determine validity of the plurality of files comprise instructions causing the machine to:
verify that another of the plurality of files specified in one of the plurality of files exists inside the application.

27. The non-transitory machine-readable medium of claim 26, wherein instructions causing the machine to execute the second subset of the plurality of static tests comprise instructions causing the machine to:
check properties of a resource stored inside the application and defined in the one of the plurality of files.

28. The non-transitory machine-readable medium of claim 27, wherein instructions causing the machine to check the properties of the resource comprise instructions causing the machine to:
check whether the resource implements a specific interface;
check whether the resource extends a specific class; and
check whether the resource is in the application class path.

29. The non-transitory machine-readable medium of claim 23 having instructions that when executed further cause the machine to:
analyze an application configuration of the application;
based on the analysis, determine the plurality of static tests to be executed for checking the plurality of files; and
build a verification manager including the determined plurality of static tests.

* * * * *